US012677745B2

(12) United States Patent
Schinstock

(10) Patent No.: US 12,677,745 B2
(45) Date of Patent: Jul. 14, 2026

(54) RAKE IMPLEMENT WITH MOVEABLE TONGUE

(71) Applicant: DEERE & COMPANY, Moline, IL (US)

(72) Inventor: William P. Schinstock, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 990 days.

(21) Appl. No.: 17/822,924

(22) Filed: Aug. 29, 2022

(65) Prior Publication Data

US 2024/0065166 A1 Feb. 29, 2024

(51) Int. Cl.
 *A01D 78/04* (2006.01)
 *A01D 78/14* (2006.01)

(52) U.S. Cl.
 CPC ..................................... *A01D 78/14* (2013.01)

(58) Field of Classification Search
 CPC ................................ A01D 78/04; A01D 78/14
 See application file for complete search history.

(56) References Cited

U.S. PATENT DOCUMENTS

| | | | | |
|---|---|---|---|---|
| 2,618,921 A | * | 11/1952 | Riley | A01D 78/04 56/377 |
| 2,638,727 A | * | 5/1953 | Park | A01D 78/14 56/192 |
| 2,683,345 A | * | 7/1954 | Meyer | A01D 78/146 56/377 |
| 2,929,187 A | * | 3/1960 | Boggio | A01D 78/04 56/15.1 |
| 3,648,448 A | * | 3/1972 | Maugg | A01D 78/12 56/400 |
| 4,183,198 A | * | 1/1980 | Sligter | A01D 78/14 56/377 |
| 4,214,429 A | * | 7/1980 | Ellis | A01D 51/00 56/10.4 |
| 4,785,614 A | * | 11/1988 | Schoenherr | A01D 78/142 56/366 |

(Continued)

FOREIGN PATENT DOCUMENTS

| | | |
|---|---|---|
| DE | 8807054 U1 | 6/1989 |
| DE | 9311671 U1 | 10/1993 |

(Continued)

OTHER PUBLICATIONS

H & S-X & HDX Rakes Brochure, pp. 1-6.
John Deere, Wheel Rakes Brochure for WR30 • WR31 • WR12, pp. 1-8.

*Primary Examiner* — Justin C Mikowski
*Assistant Examiner* — Ashley A Kaercher

(57) ABSTRACT

A center delivery rake implement includes a tongue movably attached to a frame for movement about a vertical axis. A tongue actuator interconnects the tongue and the frame. The tongue actuator is selectively controllable to position the tongue relative to the frame such that the central tongue axis may be non-parallel relative to the central longitudinal axis of the frame, whereby a lateral position of the frame relative to the tow vehicle is adjustable during operation. An implement controller may control the tongue actuator to position the frame in a desired position based on a determined location of an existing windrow.

16 Claims, 4 Drawing Sheets

(56) References Cited

U.S. PATENT DOCUMENTS

| | | | | |
|---|---|---|---|---|
| 4,905,466 A * | 3/1990 | Heppner | A01D 57/16 | 198/813 |
| 4,932,197 A * | 6/1990 | Allen | A01D 78/146 | 56/228 |
| 5,065,570 A * | 11/1991 | Kuehn | A01D 78/001 | 56/379 |
| 5,642,607 A * | 7/1997 | Stephenson | A01B 73/005 | 56/192 |
| 5,752,375 A * | 5/1998 | Tonutti | A01D 78/146 | 56/396 |
| 6,212,866 B1 * | 4/2001 | Rowse | A01D 78/146 | 56/384 |
| 6,314,710 B1 * | 11/2001 | Tonutti | A01D 78/146 | 56/378 |
| 6,405,517 B1 * | 6/2002 | Peeters | A01D 78/144 | 172/311 |
| 7,007,450 B2 * | 3/2006 | Tonutti | A01D 78/146 | 56/377 |
| 7,540,139 B2 * | 6/2009 | Rowse | A01D 78/146 | 56/377 |
| 7,584,595 B2 * | 9/2009 | Marggi | A01B 73/067 | 56/375 |
| 7,712,297 B1 * | 5/2010 | Giovannini | A01D 78/04 | 56/384 |
| 8,146,338 B1 * | 4/2012 | Cicci | A01D 78/146 | 56/385 |
| 8,186,140 B1 * | 5/2012 | Cicci | A01D 78/146 | 56/377 |
| 8,267,186 B2 * | 9/2012 | Kindley | A01B 73/065 | 172/311 |
| 8,322,124 B2 * | 12/2012 | Munk | A01D 78/144 | 56/367 |
| 9,220,188 B2 * | 12/2015 | Graham | A01D 78/146 | |
| 9,706,697 B2 * | 7/2017 | Wilkening | A01B 69/004 | |
| 9,839,180 B2 * | 12/2017 | Esch | A01D 78/1007 | |
| 10,448,573 B1 * | 10/2019 | Bellamy | A01D 69/03 | |
| 10,499,567 B2 * | 12/2019 | Schiferl | A01D 57/12 | |
| 10,499,568 B2 * | 12/2019 | Dunham | A01D 78/14 | |
| 11,202,411 B2 * | 12/2021 | Dunham | A01D 80/02 | |
| 12,137,636 B1 * | 11/2024 | Wentz | A01D 78/146 | |
| 12,302,794 B2 * | 5/2025 | Dunham | A01D 80/02 | |
| 2004/0093843 A1 * | 5/2004 | Tonutti | A01D 78/146 | 56/377 |
| 2005/0076630 A1 * | 4/2005 | Tonutti | A01D 78/146 | 56/378 |
| 2006/0032631 A1 * | 2/2006 | Rowse | A01D 78/146 | 166/268 |
| 2007/0163223 A1 * | 7/2007 | Hruska | A01D 78/146 | 56/375 |
| 2008/0163602 A1 * | 7/2008 | Marggi | A01D 78/146 | 56/385 |
| 2012/0036820 A1 * | 2/2012 | Munk | A01D 78/144 | 56/366 |
| 2012/0117935 A1 * | 5/2012 | Cicci | A01D 78/146 | 56/366 |
| 2013/0263567 A1 * | 10/2013 | Bassett | A01D 78/14 | 56/397 |
| 2016/0366823 A1 * | 12/2016 | Esch | A01D 78/1071 | |
| 2017/0094908 A1 * | 4/2017 | Dunham | A01D 80/02 | |
| 2017/0105330 A1 * | 4/2017 | Mashburn | A01D 78/14 | |
| 2018/0317390 A1 * | 11/2018 | Schiferl | A01D 78/14 | |
| 2019/0380255 A1 * | 12/2019 | Higel | A01B 73/048 | |
| 2020/0084970 A1 * | 3/2020 | Dunham | A01D 80/02 | |
| 2022/0061220 A1 * | 3/2022 | Sommerfeld | A01D 80/02 | |
| 2022/0087108 A1 * | 3/2022 | Dunham | A01D 80/02 | |
| 2023/0082908 A1 * | 3/2023 | Franzen | A01B 59/04 | 280/475 |
| 2024/0324511 A1 * | 10/2024 | Kumbhar | A01D 57/20 | |
| 2025/0024784 A1 * | 1/2025 | Somarowthu | G06T 7/73 | |
| 2025/0185542 A1 * | 6/2025 | Somarowthu | A01D 57/20 | |

FOREIGN PATENT DOCUMENTS

| | | | |
|---|---|---|---|
| EP | 0337559 A1 | 10/1989 | |
| EP | 2277370 A2 | 1/2011 | |
| EP | 2281435 A2 | 2/2011 | |

* cited by examiner

RAKE IMPLEMENT WITH MOVEABLE TONGUE

TECHNICAL FIELD

The disclosure generally relates to a center delivery rake implement having a moveable tongue.

BACKGROUND

Rake implements are generally drawn by a tow vehicle, e.g., a tractor, and operate to move cut crop material laterally relative to a direction of travel and form the crop material into a windrow. A desirable factor of moving the cut crop material into a single windrow includes disturbing the crop material during movement, thereby increasing air circulation around the cut crop material and decreasing dry-down time.

The rake implement may be configured as a side delivery implement, in which the windrow is formed on a lateral side of the tow vehicle, i.e., either the left side or the right side of the tow vehicle relative to a longitudinal centerline of the tow vehicle. In other implementations, the rake implement may be configured as a center delivery implement, in which the windrow is formed approximately on the longitudinal centerline of the tow vehicle.

A rake implement configured as a center delivery implement typically includes a left arm and a right arm. The left arm has a rake system that gathers cut crop material from the left side of the tow vehicle and moves the crop material onto the approximate centerline of the tow vehicle. The right arm has a respective rake system that gathers cut crop material from the right side of the tow vehicle and moves the crop material onto the approximate centerline of the tow vehicle, whereby the crop material from the left side and the right side may be combined into a single windrow generally aligned with the centerline of the tow vehicle.

When the rake implement is configured as a center delivery implement having both the left arm and the right arm, the left and right arms are generally pivotably attached to a structure and movable between a transport position and a V-shaped operating position. When disposed in the V-shaped operating position, two parallel incoming or existing windrows of crop material may be moved laterally relative to a direction of travel of the rake implement and repositioned to form a single outgoing windrow of crop material.

Rake implements currently available are designed to be drawn directly behind a tow vehicle, such that a center of the rake implement is generally aligned with a center of the tow vehicle. The desired location to position the outgoing or finished windrow is generally between the two incoming or existing windrows, on soil that has not been previously covered by cut crop and is therefore generally more dry. This location is preferred to facilitate further drying of the crop in the outgoing or finished windrow. For certain tow vehicle and rake implement combinations, mower widths, mower windrow widths, rake width, etc., delivering the outgoing windrow of raked crop material to the desired or preferred location may require the tow vehicle drive over one of the incoming or existing windrows. Driving over the crop material may cause leaf loss and damage or reduce feed quality and/or value. Avoiding the tow vehicle overrunning the existing incoming windrow may result in the outgoing windrow being positioned in an undesirable location and/or portions thereof not being disturbed.

SUMMARY

A rake implement for moving cut crop material laterally to form a windrow is disclosed. The rake implement includes a frame extending along a central longitudinal axis parallel to a direction of travel of the rake implement. The central longitudinal axis bisects the frame to define a first lateral side of the frame and a second lateral side of the frame. A first arm is attached to the frame and supports a first rake system disposed on the first side of the frame. A second arm is attached to the frame and supports a second rake system disposed on the second side of the frame. The first arm and the second arm are arranged to position the first rake system and the second rake system in a substantially V-shaped configuration to form a center delivery windrow therebetween. A tongue extends along a central tongue axis between a rearward end of the tongue and a forward end of the tongue. The rearward end of the tongue is movably attached to the frame for movement about a vertical axis. The forward end of the tongue is configured for attachment to a tow vehicle. A tongue actuator interconnects the tongue and the frame. The tongue actuator is selectively controllable to position the tongue relative to the frame such that the central tongue axis is non-parallel relative to the central longitudinal axis of the frame, whereby a lateral position of the frame relative to the tow vehicle is adjustable.

In one aspect of the disclosure, the tongue actuator may include one of a linear actuator or a rotary actuator. In one implementation, the tongue actuator is a linear actuator operable to extend and retract. More particularly, the tongue actuator may include a double acting hydraulic cylinder.

In one aspect of the disclosure, the rake implement may further include an implement controller. The implement controller includes a processor and a memory having a position control algorithm stored thereon. The processor is operable to execute the position control algorithm to communicate a control signal to the tongue actuator to effectuate movement of the tongue actuator.

In one aspect of the disclosure, the processor is operable to execute the position control algorithm to determine a location of at least one incoming windrow and control the tongue actuator to position the frame relative to the incoming windrow such that an outgoing windrow is positioned along a desired path. In one implementation, the at least one incoming windrow includes a first incoming windrow and a second incoming windrow. The desired path of the outgoing windrow may be disposed between the first incoming windrow and the second incoming windrow.

In one aspect of the disclosure, the processor is operable to execute the position control algorithm to position the frame, via the tongue actuator, between the first incoming windrow and the second incoming windrow, such that the first rake system engages the first incoming windrow and the second rake system engages the second incoming windrow. The implement controller may control the tongue actuator via the sensed or otherwise identified locations of the first incoming windrow and/or the second incoming windrow. In other words, the implement controller may determine or identify the location of the first incoming windrow and/or the second incoming windrow, use the location of the first incoming windrow and/or the second incoming windrow to determine a desired location of the frame of the rake implement, and then generate the control signal to the tongue actuator to position the frame in the desired location.

In one aspect of the disclosure, the first arm may be moveably attached to the frame via a first linkage system. The first linkage system may be selectively configurable to position the first arm relative to the frame in a transport position of the first arm in which the first arm is positioned on the first lateral side of the frame substantially parallel with the central longitudinal axis. The first linkage system may further be selectively configurable to position the first arm relative to the frame in a first operating position of the first arm. Similarly, the second arm may be moveably attached to the frame via a second linkage system. The second linkage system may be selectively configurable to position the second arm relative to the frame in a transport position of the second arm in which the second arm is positioned on the second lateral side of the frame substantially parallel with the central longitudinal axis. The second linkage system may further be selectively configurable to position the second arm relative to the frame in a first operating position of the second arm. The first operating position of the first arm and the first operating position of the second arm may form the generally V-shaped center delivery rake system, whereby the first incoming windrow and/or the second incoming windrow may be moved laterally relative to the direction of travel of the rake implement to form the outgoing windrow.

Accordingly, the rake implement may be laterally offset from a centerline of the tow vehicle, thereby providing greater flexibility in maneuvering and/or positioning the tow vehicle relative to the incoming or existing windrows to avoid overrunning the existing windrows with the tow vehicle.

The above features and advantages and other features and advantages of the present teachings are readily apparent from the following detailed description of the best modes for carrying out the teachings when taken in connection with the accompanying drawings.

DETAILED DESCRIPTION

Figure 1:
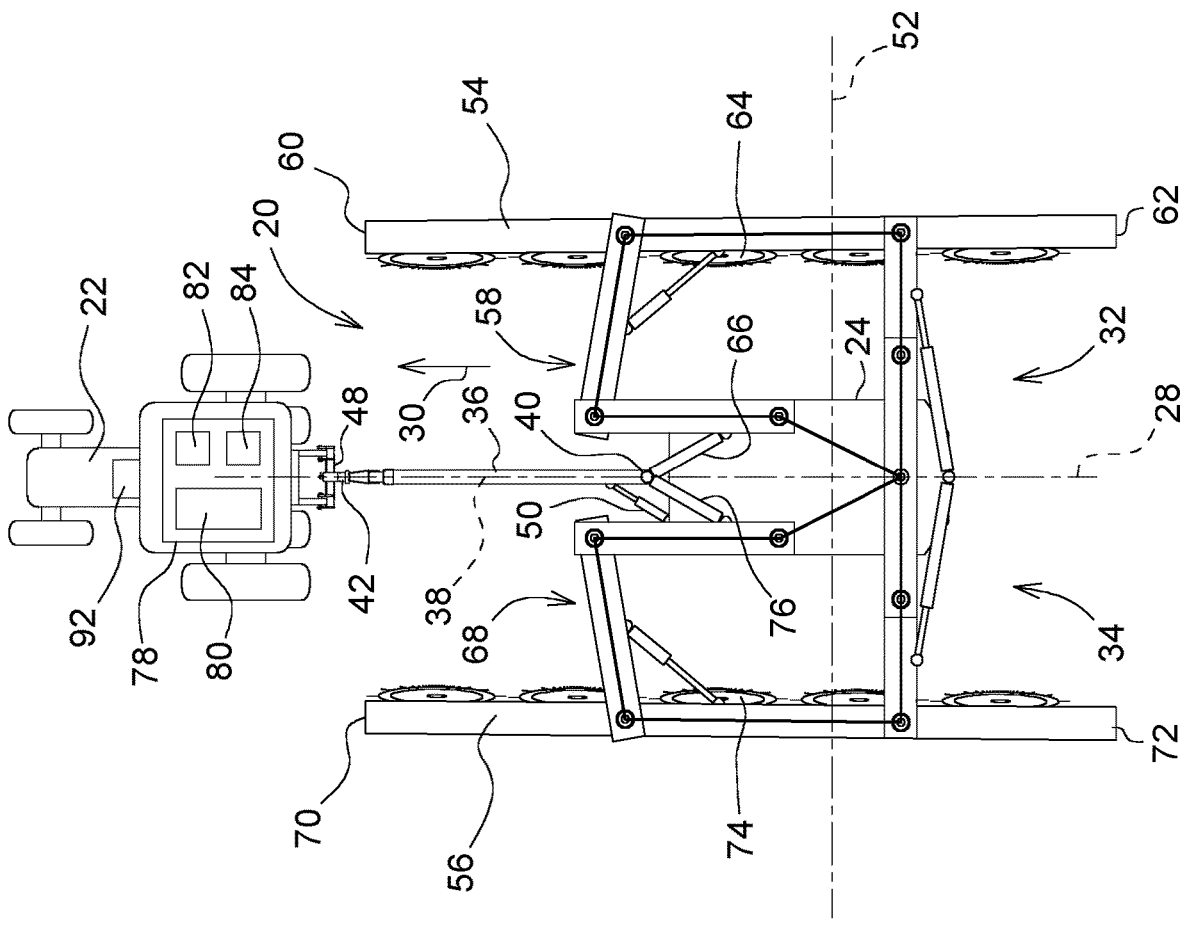
FIG. 1 is a schematic plan view of a tow vehicle pulling a rake implement configured in a transport position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a rake implement is generally shown at 20. The rake implement 20 may be pulled or drawn by a tow vehicle 22, such as but not limited to a tractor. The rake implement 20 is moved through a field to move cut crop material laterally relative to a direction of travel 30 of the rake implement 20 to form a windrow of gathered crop material.

The rake implement 20 includes a frame 24. The frame 24 may be manufactured from several different components attached together to form a rigid structure capable of supporting the various components of the rake implement 20. Additionally, the frame 24 may include one or more ground engaging elements 26, such as but not limited to tires and/or tracks, for moveably supporting the frame 24 relative to a ground surface. The frame 24 extends along a central longitudinal axis 28 that is generally parallel with the direction of travel 30 of the rake implement 20 during operation. As used herein, the terms forward, rearward, left, and right are used relative to the direction of travel 30 of the rake implement 20 during operation. The central longitudinal axis 28 of the frame 24 bisects the frame 24 to define a first lateral side 32 of the frame 24, e.g., a right side of the frame 24, and a second lateral side 34 of the frame 24, e.g., a left side of the frame 24.

Figure 2:
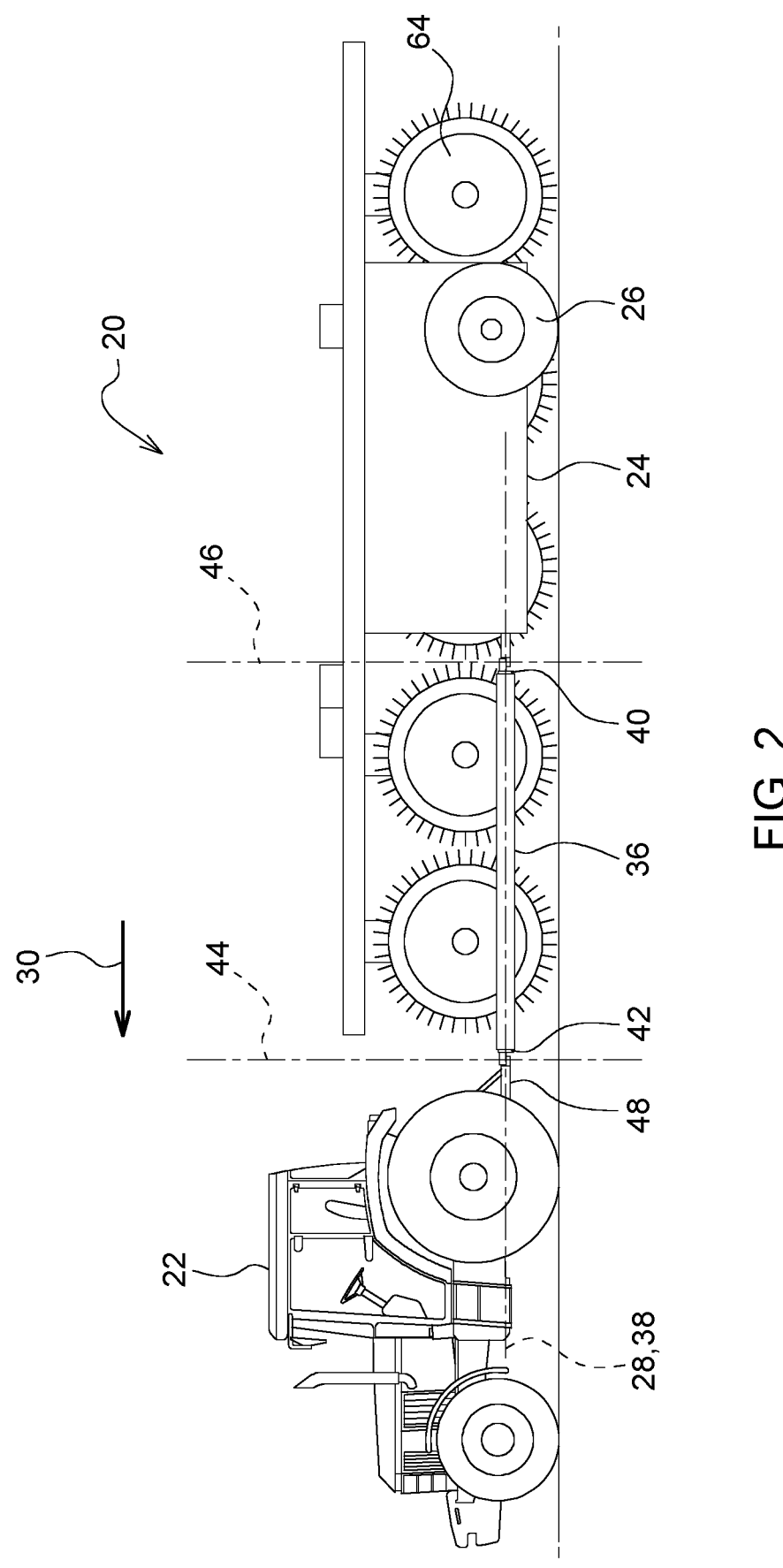
FIG. 2 is a schematic side view of the tow vehicle and the rake implement.

The frame 24 includes a tongue 36 that extends outward from the frame 24 in a forward direction. The tongue 36 extends along a central tongue axis 38, between a rearward end 40 of the tongue 36 and a forward end 42 of the tongue 36. As shown in FIG. 2, the rearward end 40 of the tongue 36 is moveably attached to the frame 24 for movement about a first vertical axis 44. The tongue 36 may be moveably attached to the frame 24 in a suitable manner, such as but not limited, to a pivot pin and yoke connection. The manner and components used to pivotably connect the tongue 36 and the frame 24 are understood by those skilled in the art, and are therefore not described in greater detail herein.

As shown in FIG. 2, the forward end 42 of the tongue 36 is configured for and may be movably attached to the tow vehicle 22 for movement about a second vertical axis 46. The tongue 36 may include a hitch system 48 located proximate the forward end 42 of the tongue 36 that is configured for attachment to the tow vehicle 22. The hitch system 48 may include, but is not limited to, a three point hitch, a two point hitch, a drawbar, etc. The features and operation of the hitch system 48 are understood by those skilled in the art, not pertinent to the teachings of this disclosure, and are therefore not described in greater detail herein.

Figure 3:
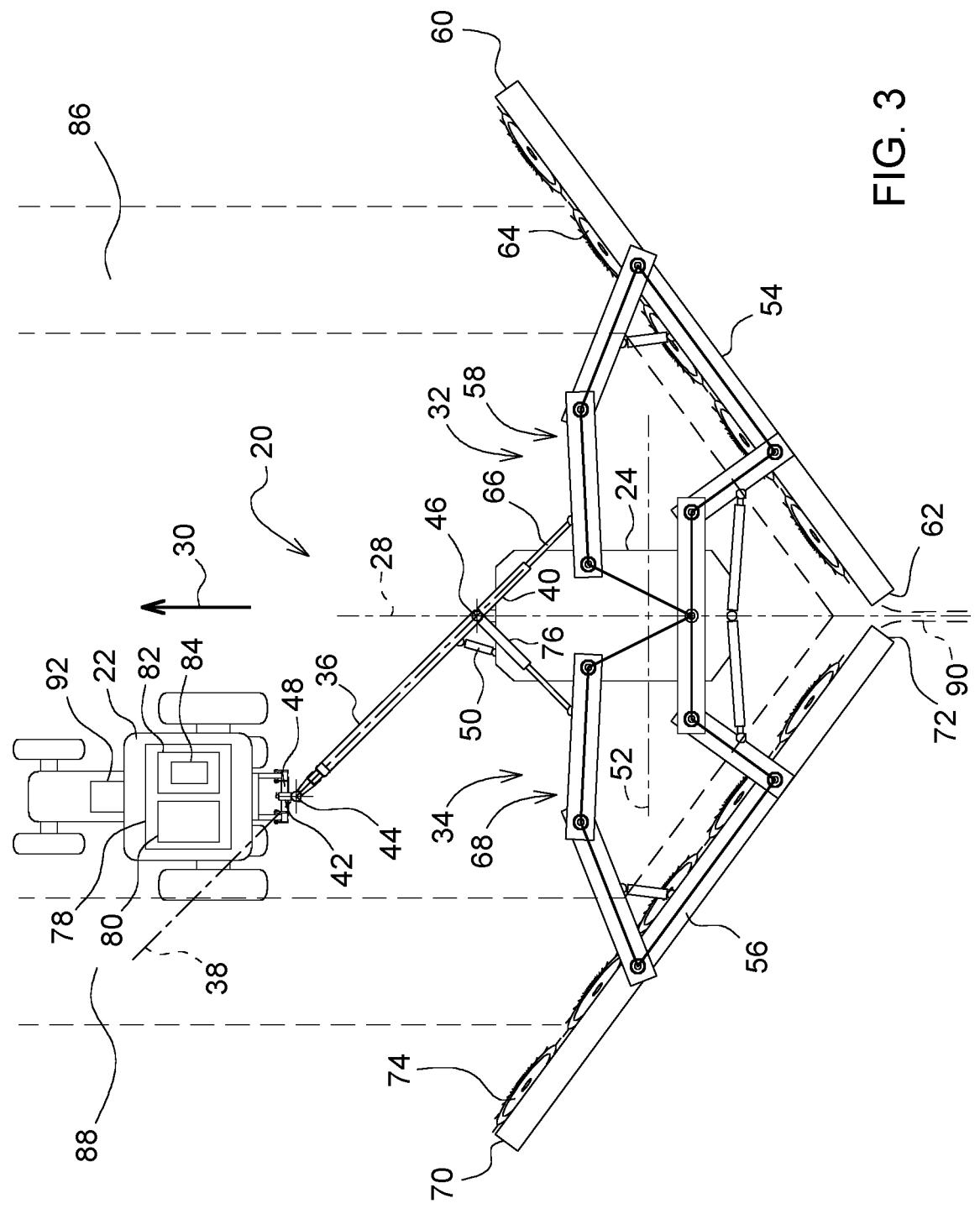
FIG. 3 is a schematic plan view of the tow vehicle and the rake implement, with the rake implement configured to be laterally offset to a right side of the tow vehicle.
Figure 4:
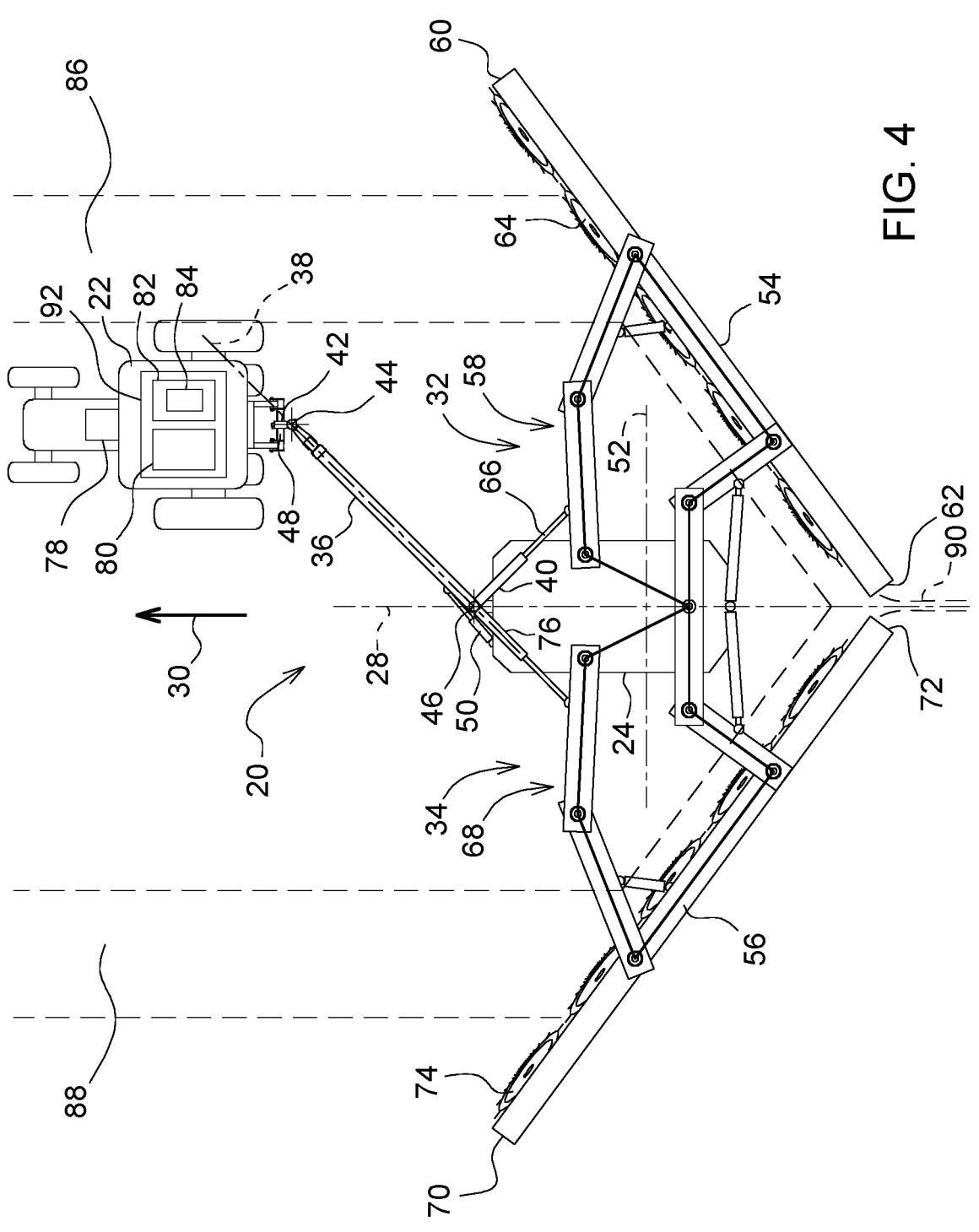
FIG. 4 is a schematic plan view of the tow vehicle and the rake implement, with the rake implement configured to be laterally offset to a left side of the tow vehicle.

As best shown in FIGS. 1, 3 and 4, a tongue actuator 50 interconnects the tongue 36 and the frame 24. As shown in FIGS. 3 and 4, the tongue actuator 50 may be selectively controllable to position the tongue 36 relative to the frame 24 such that the central tongue axis 38 is non-parallel relative to the central longitudinal axis 28 of the frame 24, thereby forming a non-right angle between the tongue 36 and the frame 24. This configuration and/or positioning of the tongue 36 relative to the frame 24, i.e., in which the central tongue axis 38 is non-parallel relative to the central longitudinal axis 28 of the frame 24, results in the frame 24 be positioned laterally offset relative to the tow vehicle 22. Accordingly adjusting or moving the tongue 36 relative to the frame 24 adjusts a lateral position of the frame 24 relative to the tow vehicle 22.

As shown in FIG. 1, it should be appreciated that when the tongue 36 is positioned at a substantially perpendicular orientation relative to the frame 24, and more precisely when the tongue 36 is positioned substantially perpendicular to a transverse axis 52 extending through and defined by the ground engaging elements 26 supporting the frame 24, then the frame 24 will follow directly behind the tow vehicle 22 with no substantial or noticeable lateral offset. However, as shown in FIGS. 3 and 4, if the tongue 36 is positioned at a non-parallel orientation relative to the central longitudinal axis 28 of the frame 24, and more precisely a substantially non-perpendicular orientation relative to the transverse axis 52 extending through and defined by the ground engaging elements 26 supporting the frame 24, then the frame 24 will track laterally and will follow the tow vehicle 22 in a laterally offset position relative to the tow vehicle 22. For example, as shown in FIG. 3, if the tongue 36 is angled in a leftward direction relative to the frame 24, i.e., extends from the frame 24 forward and toward the left side of the frame 24, then the frame 24 will track to the right side of the tow vehicle 22. In contrast, as shown in FIG. 4, if the tongue 36 is angled in a rightward direction relative to the frame 24, i.e., extends from the frame 24 forward and toward the right side of the frame 24, then the frame 24 will track to the left side of the tow vehicle 22.

In one aspect of the disclosure, the tongue actuator 50 is one of a linear actuator or a rotary actuator. For example, the tongue actuator 50 may include a linear actuator operable to extend and retract along a linear path. The linear actuator may include, but is not limited, to, an electric actuator or a double acting hydraulic cylinder. In another implementation, the tongue actuator 50 may include a rotary actuator that is operable to output a rotational movement or torque. The rotary actuator may include, but is not limited, to, an electric motor or hydraulic motor.

The rake implement 20 includes a first arm 54 and a second arm 56. A first linkage system 58 interconnects the frame 24 and the first arm 54. The first arm 54 is disposed on the first lateral side 32 of the frame 24, and includes a forward end 60 and a rearward end 62 relative to the direction of travel 30. The first arm 54 may include one or more ground engaging elements, such as but not limited to tires and/or tracks, for moveably supporting the first arm 54 relative to the ground surface.

The first arm 54 includes a structure that supports a first rake system 64. The first rake system 64 is disposed on the first arm 54 and is operable to move cut crop material laterally relative to the central longitudinal axis 28. The first rake system 64 is operable to move the cut crop material from the forward end 60 of the first arm 54, inward toward the central longitudinal axis 28 and the rearward end 62 of the first arm 54. The first rake system 64 may include, but is not limited to, one or more wheel type rakes and/or a parallel bar type rake as understood by those skilled in the art. The specific features and operation of the first rake system 64 are understood by those skilled in the art, are not pertinent to the teachings of this disclosure, and are therefore not described in greater detail herein.

As described above, the first linkage system 58 interconnects the frame 24 and the first arm 54. The first linkage system 58 may include any system that moveable connects the first arm 54 to the frame 24. For example, the first linkage system 58 may include a plurality of linkage bars interconnecting the first arm 54 and the frame 24.

The rake implement 20 includes a first actuator system 66 interconnecting the frame 24 and the first linkage system 58. It should be appreciated that the first actuator system 66 may include multiple actuators. The first actuator system 66 may include, but is not limited to, one of a linear actuator that generates linear movement, or a rotary actuator that generates rotational movement. The first actuator system 66 may include but is not limited to, one or more of a hydraulic actuator, an electric actuator, a pneumatic actuator, etc.

The first actuator system 66 is configured to move the first linkage system 58 to thereby move the first arm 54 between at least a transport position of the first arm 54 (shown in FIG. 1), and a first operating position of the first arm 54 (shown in FIGS. 3 and 4). When the first linkage system 58 is selectively configured to position the first arm 54 relative to the frame 24 in the transport position of the first arm 54, such as shown in FIG. 1, the first arm 54 is positioned on the first lateral side 32 of the frame 24 substantially parallel with the central longitudinal axis 28. When the first linkage system 58 is selectively configured to position the first arm 54 relative to the frame 24 in the first operating position of the first arm 54, such as shown in FIGS. 3 and 4, the first arm 54 is substantially non-parallel with the central longitudinal axis 28.

A second linkage system 68 interconnects the frame 24 and the second arm 56. The second arm 56 is disposed on the second lateral side 34 of the frame 24, and includes a forward end 70 and a rearward end 72 relative to the direction of travel 30. The second arm 56 may include one or more ground engaging elements, such as but not limited to tires and/or tracks, for moveably supporting the second arm 56 relative to the ground surface.

The second arm 56 includes a structure that supports a second rake system 74. The second rake system 74 is disposed on the second arm 56 and is operable to move cut crop material laterally relative to the central longitudinal axis 28. The second rake system 74 is operable to move the cut crop material from the forward end 70 of the second arm 56, inward toward the central longitudinal axis 28 and the rearward end 72 of the second arm 56. The second rake system 74 may include, but is not limited to, one or more wheel type rakes and/or a parallel bar style rake as understood by those skilled in the art. The specific features and operation of the second rake system 74 are understood by those skilled in the art, are not pertinent to the teachings of this disclosure, and are therefore not described in greater detail herein.

As described above, the second linkage system 68 interconnects the frame 24 and the first arm 54. The second linkage system 68 may include any system that moveable connects the second arm 56 to the frame 24. For example, the second linkage system 68 may include a plurality of linkage bars interconnecting the second arm 56 and the frame 24.

The rake implement 20 includes a second actuator system 76 interconnecting the frame 24 and the second linkage system 68. It should be appreciated that the second actuator system 76 may include multiple actuators. The second actuator system 76 may include, but is not limited to, one of a linear actuator that generates linear movement, or a rotary actuator that generates rotational movement. The second actuator system 76 may include but is not limited to, one or more of a hydraulic actuator, an electric actuator, a pneumatic actuator, etc.

The second actuator system 76 is configured to move the second linkage system 68 to thereby move the second arm 56 between a transport position of the second arm 56 (shown in FIG. 1), and a first operating position of the second arm 56 (shown in FIGS. 3 and 4). When the second linkage system 68 is selectively configured to position the second arm 56 relative to the frame 24 in the transport position of the second arm 56, such as shown in FIG. 1, the second arm 56 is positioned on the second lateral side 34 of the frame 24 substantially parallel with the central longitudinal axis 28. When the second linkage system 68 is selectively configured to position the second arm 56 relative to the frame 24 in a first operating position of the second arm 56, such as shown in FIGS. 3 and 4, the second arm 56 is substantially non-parallel with the central longitudinal axis 28 30.

In one configuration of the rake implement 20, referring to FIGS. 3 and 4, the first arm 54 may be disposed in the first operating position of the first arm 54 and the second arm 56 may be disposed in the first operating position of the second arm 56. In this configuration, the rearward end 62 of the first arm 54 and the rearward end 72 of the second arm 56 are substantially aligned with each other at a common axial position on the central longitudinal axis 28. Additionally, in this configuration the rearward end 62 of the first arm 54 and the rearward end 72 of the second arm 56 are laterally spaced from each other across the central longitudinal axis 28 to thereby form a traditional V-shaped center delivery rake arrangement.

The rake implement 20 may further include an implement controller 78. The implement controller 78 may be disposed in communication with at least the tongue actuator 50. The implement controller 78 is operable to control operation of the tongue actuator 50. While the implement controller 78 is generally described herein as a singular device, it should be appreciated that the implement controller 78 may include multiple devices linked together to share and/or communicate information therebetween. Furthermore, it should be appreciated that the implement controller 78 may be located on the rake implement 20 or located remotely from the rake implement 20, such as but not limited to the tow vehicle 22.

The implement controller 78 may alternatively be referred to as a computing device, a computer, a controller, a control unit, a control module, a module, etc. The implement controller 78 includes a processor 80, a memory 82, and all software, hardware, algorithms, connections, sensors, etc., necessary to manage and control the operation of the tongue actuator 50. As such, a method may be embodied as a program or algorithm operable on the implement controller 78. It should be appreciated that the implement controller 78 may include any device capable of analyzing data from various sensors, comparing data, making decisions, and executing the required tasks.

As used herein, "implement controller 78" is intended to be used consistent with how the term is used by a person of skill in the art, and refers to a computing component with processing, memory, and communication capabilities, which is utilized to execute instructions (i.e., stored on the memory 82 or received via the communication capabilities) to control or communicate with one or more other components. In certain embodiments, the implement controller 78 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The implement controller 78 may be in communication with other components on the rake implement 20 and/or tow vehicle 22, such as hydraulic components, electrical components, and operator inputs within an operator station of the associated tow vehicle 22. The implement controller 78 may be electrically connected to these other components by a wiring harness such that messages, commands, and electrical power may be transmitted between the implement controller 78 and the other components. Although the implement controller 78 is referenced in the singular, in alternative embodiments the configuration and functionality described herein can be split across multiple devices using techniques known to a person of ordinary skill in the art.

The implement controller 78 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 82 may include any non-transitory/tangible medium which participates in providing data or computer-readable instructions. The memory 82 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The implement controller 78 includes the tangible, non-transitory memory 82 on which are recorded computer-executable instructions, including a position control algorithm 84. The processor 80 of the implement controller 78 is configured for executing the position control algorithm 84. The position control algorithm 84 implements a method of controlling the rake implement 20, described in detail below.

The implement controller 78 may be configured to communicate a control signal to the tongue actuator 50. The control signal may include, but is not limited to, one of an electric, hydraulic, pneumatic signal that causes, either directly or indirectly via other components, movement of the tongue actuator 50. The implement controller 78 may communicate the control signal to effectuate movement of the tongue actuator 50.

In one implementation, the control signal may include, but is not limited to, an electronic signal to an electronically actuated hydraulic control valve. The hydraulic control valve may open fluid communication to the tongue actuator 50 to supply the tongue actuator 50 with fluid, thereby causing the tongue actuator 50 to extend or retract, depending upon which end of the hydraulic cylinder the fluid is supplied. The general operation of a double acting hydraulic cylinder is understood by those skilled in the art, is not pertinent to the teachings of this disclosure, and is therefore not described in greater detail herein. In other implementations, the control signal may include an electronic signal that actuates an electric motor, etc. It should be appreciated that the type and operation of the control signal may differ based on the type and operation of the tongue actuator 50, and may differ from the example implementations described herein.

In one implementation, the implement controller 78 may communicate the control signal to effectuate movement of the tongue actuator 50 based on a lateral position of at least one incoming windrow 86, 88 relative to the tow vehicle 22 and/or the frame 24 of the rake implement 20. For example, the implement controller 78 may communicate the control signal based on a lateral position of the at least one in coming windrow relative to the tow vehicle 22.

The incoming windrow 86, 88 may be considered a pre-existing windrow that is engaged and moved laterally by the rake implement 20. The incoming windrow 86, 88 is moved to form an outgoing windrow 90. In one example implementation, the at least one incoming windrow 86, 88 includes a first incoming windrow 86 and a second incoming windrow 88. The first incoming windrow 86 and the second incoming windrow 88 may be generally parallel with each other and spaced apart. The implement controller 78 may position the frame 24, via the tongue actuator 50, between the first incoming windrow 86 and the second incoming windrow 88, such that the first rake system 64 engages the first incoming windrow 86 and the second rake system 74 engages the second incoming windrow 88. By doing so, the first incoming windrow 86 and the second incoming windrow 88 may be moved laterally and combined to form the outgoing windrow 90. As such, the tow vehicle 22 may be maneuvered to avoid overrunning one of the first incoming windrow 86 and the second incoming windrow 88, while the implement controller 78 controls the position of the frame 24 via the tongue 36 controller so that the first rake system 64 continuously engages the first incoming windrow 86 and the second rake system 74 continuously engages the second incoming windrow 88, with the outgoing windrow 90 deposited between the first incoming windrow 86 and the second incoming windrow 88. While the process has been described above with reference to both the first incoming windrow 86 and the second incoming windrow 88, it should be appreciated that the implement controller 78 may control the lateral position of the frame 24 relative to the tow vehicle 22, via the tongue actuator 50, to follow, gather and move a single windrow.

In order to control the tongue actuator 50 to position the frame 24 laterally relative to the tow vehicle 22 to engage a windrow, the implement controller 78 may include a windrow location sensor 92 that is positioned and operable to determine a location of the at least one incoming windrow 86, 88. The implement controller 78 may use the sensed or determined position of the incoming windrow 86, 88 to control the tongue actuator 50 in order to position the frame 24 relative to the incoming windrow 86, 88 for proper engagement with the incoming windrow 86, 88. In addition, the implement controller 78 may use the sensed or determine deposition of the incoming windrow 86, 88 to control the tongue actuator 50 in order to position the outgoing windrow 90 along a desired path or lateral position. In other words, the implement controller 78 may use the location of the incoming windrow 86, 88 to position the frame 24 for engagement with the incoming windrow 86, 88, and/or for proper placement of the outgoing windrow 90.

In one implementation, the windrow location sensor 92 may include a camera, a radar, a lidar, etc., to sense data related to the incoming windrow 86, 88. The windrow location sensor 92 may be located on the rake implement 20 or on the tow vehicle 22. The windrow location sensor 92 is in communication with the implement controller 78 for communicating sensed data thereto. It should be appreciated that the implement controller 78 may include an identification algorithm operable to identify the windrow, and a location algorithm operable to determine the location of the windrow, based on the data from the windrow location sensor 92.

In one implementation, in addition to controlling the tongue actuator 50 to control the lateral position of the frame 24 relative to the tow vehicle 22, the implement controller 78 may further control a position of the first linkage system 58 to position the first arm 54 relative to the frame 24, and control a position of the second linkage system 68 to position the second arm 56 relative to the frame 24. By doing so, the implement controller 78 may configure the first arm 54 for an optimal position via control of the first linkage system 58, may configure the second arm 56 for an optimal position via control of the second linkage system 68, and configure the lateral position of the frame 24 via control of the tongue actuator 50.

The implement controller 78 may control the first linkage system 58 by communicating a control signal to the first actuator system 66, and/or may control the second linkage system 68 by communication a control signal to the second actuator system 76. In one implementation, the control signal for the first actuator system 66 and/or the second actuator system 76 may include, but is not limited to, an electronic signal to an electronically actuated hydraulic control valve. The hydraulic control valve may open fluid communication to the first actuator system 66 and/or the second actuator system 76 to supply fluid thereto, thereby causing the first actuator system 66 and/or the second actuator system 76 to extend or retract, depending upon which end of the hydraulic cylinder the fluid is supplied. The general operation of a double acting hydraulic cylinder is understood by those skilled in the art, is not pertinent to the teachings of this disclosure, and is therefore not described in greater detail herein. In other implementations, the control signal may include an electronic signal that actuates an electric motor, etc. It should be appreciated that the type and operation of the control signal may differ based on the type and operation of the first actuator system 66 and/or the second actuator system 76, and may differ from the example implementations described herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A rake implement for moving cut crop material laterally to form a windrow, the rake implement comprising:

a frame extending along a central longitudinal axis parallel to a direction of travel, with the central longitudinal axis bisecting the frame to define a first lateral side of the frame and a second lateral side of the frame;

a first arm attached to the frame and supporting a first rake system disposed on the first side of the frame;

a second arm attached to the frame and supporting a second rake system disposed on the second side of the frame;

wherein the first arm and the second arm are arranged to position the first rake system and the second rake system in a substantially V-shaped configuration to form a center delivery windrow therebetween;

a tongue extending along a central tongue axis between a rearward end of the tongue that is movably attached to the frame for movement about a vertical axis, and a forward end of the tongue configured for attachment to a tow vehicle;

a tongue actuator interconnecting the tongue and the frame, wherein the tongue actuator is selectively controllable to move the tongue relative to the frame whereby a lateral position of the frame relative to the tow vehicle is adjustable;

an implement controller including a processor and a memory having a position control algorithm stored thereon, wherein the processor is operable to execute the position control algorithm to communicate a control signal to the tongue actuator to effectuate movement of the tongue actuator;

wherein the processor is operable to execute the position control algorithm to determine a location of at least one incoming windrow and control the tongue actuator to position the frame relative to the incoming windrow such that an outgoing windrow is positioned along a desired path; and wherein the at least one incoming windrow includes a first incoming windrow and a second incoming windrow, and wherein processor is operable to execute the position control algorithm to position the frame, via the tongue actuator, between the first incoming windrow and the second incoming windrow, such that the first rake system engages the first incoming windrow and the second rake system engages the second incoming windrow.

2. The rake implement set forth in claim 1, wherein the tongue actuator is one of a linear actuator or a rotary actuator.

3. The rake implement set forth in claim 1, wherein the tongue actuator is a linear actuator operable to extend and retract.

4. The rake implement set forth in claim 3, wherein the tongue actuator is a double acting hydraulic cylinder.

5. The rake implement set forth in claim 1, wherein the first arm is moveably attached to the frame via a first linkage system.

6. The rake implement set forth in claim 5, wherein the first linkage system is selectively configurable to position the first arm relative to the frame in a transport position of the first arm in which the first arm is positioned on the first lateral side of the frame substantially parallel with the central longitudinal axis, and wherein the first linkage system is selectively configurable to position the first arm relative to the frame in a first operating position of the first arm.

7. The rake implement set forth in claim 1, wherein the second arm is moveably attached to the frame via a second linkage system.

8. The rake implement set forth in claim 7, wherein the second linkage system is selectively configurable to position the second arm relative to the frame in a transport position of the second arm in which the second arm is positioned on the second lateral side of the frame substantially parallel with the central longitudinal axis, and wherein the second linkage system is selectively configurable to position the second arm relative to the frame in a first operating position of the second arm.

9. A rake implement for moving cut crop material laterally to form a windrow, the rake implement comprising:

a tow vehicle;

a frame extending along a central longitudinal axis parallel to a direction of travel, with the central longitudinal axis bisecting the frame to define a first lateral side of the frame and a second lateral side of the frame;

a first arm attached to the frame and supporting a first rake system disposed on the first side of the frame;

a second arm attached to the frame and supporting a second rake system disposed on the second side of the frame;

wherein the first arm and the second arm are arranged to position the first rake system and the second rake system in a substantially V-shaped configuration to form a center delivery windrow therebetween;

a tongue extending along a central tongue axis between a rearward end of the tongue that is movably attached to the frame for movement about a first vertical axis, and a forward end of the tongue that is moveably attached to the tow vehicle for movement about a second vertical axis;

a tongue actuator interconnecting the tongue and the frame, wherein the tongue actuator is selectively controllable to position the tongue relative to the frame such that the central tongue axis is non-parallel relative to the central longitudinal axis of the frame, whereby a lateral position of the frame relative to the tow vehicle is adjustable;

an implement controller including a processor and a memory having a position control algorithm stored thereon, wherein the processor is operable to execute the position control algorithm to communicate a control signal to the tongue actuator to effectuate movement of the tongue actuator based on a lateral position of at least one incoming windrow; and wherein the at least one incoming windrow includes a first incoming windrow and a second incoming windrow, and wherein processor is operable to execute the position control algorithm to position the frame, via the tongue actuator, between the first incoming windrow and the second incoming windrow, such that the first rake system engages the first incoming windrow and the second rake system engages the second incoming windrow.

10. The rake implement set forth in claim 9, wherein the tongue actuator is one of a linear actuator or a rotary actuator.

11. The rake implement set forth in claim 9, wherein the tongue actuator is a linear actuator operable to extend and retract.

12. The rake implement set forth in claim 11, wherein the tongue actuator is a double acting hydraulic cylinder.

13. The rake implement set forth in claim 9, wherein the first arm is moveably attached to the frame via a first linkage system.

14. The rake implement set forth in claim 13, wherein the processor is operable to execute the position control algorithm to control a position of the first linkage system to position the first arm relative to the frame.

15. The rake implement set forth in claim 13, wherein the processor is operable to execute the position control algorithm to control a position of the second linkage system to position the second arm relative to the frame.

16. The rake implement set forth in claim 9, wherein the second arm is moveably attached to the frame via a second linkage system.

* * * * *